United States Patent Office 3,488,317
Patented Jan. 6, 1970

3,488,317
GLASS FIBER-CONTAINING HIGH MOLECULAR POLYCARBONATES
Wilhelm Hechelhammer, Dietrich Michael, Hugo Streib, and Karl-Heinrich Meyer, Krefeld-Bockum, Germany, assignors to Farbenfabriken Bayer Aktiengesellschaft, Leverkusen, Germany, a corporation of Germany
No Drawing. Filed Feb. 7, 1966, Ser. No. 525,307
Claims priority, application Germany, Feb. 5, 1965,
F 45,153
Int. Cl. C08g 51/10, 39/00
U.S. Cl. 260—37                                   7 Claims The present invention relates to glass fiber-containing polycarbonates, more particularly to glass fiber-containing polycarbonates having improved properties, and to a process for preparing the same.

It is known that the mechanical properties of synthetic resins, such as polyamides, polyesters and polycarbonates can be considerably improved by the addition of glass fibers. In particular, the tensile strength and the bending strength as well as the thermal stability of these synthetic resins are greatly improved. Glass fiber-reinforced synthetic resins are, therefore, especially suitable for the production of molded articles which are mechanically stressed at comparatively high temperatures.

However, it has been found that the density of glass fiber-containing, high molecular weight polycarbonates produced in the usual manner does not correspond to the theoretical value which is calculated from the proportions and the density of the pure resin and the glass. For example, the density of articles obtained from injection molding is about 2 or more percent below the theoretical value, while the density of molded articles obtained by extrusion in the free atmosphere is from about 15 to about 25 percent below the theoretical value. It has been found that articles molded from these glass fiber-containing, high molecular weight polycarbonates having a density below about 98 percent of the theoretical value possess hollow spaces which are filled with gases and vapors.

Consequently, injection molded parts from these glass fiber-containing polycarbonates, especially large surface parts or those parts produced with machines, which utilize only low injection pressure have rough surfaces, exhibit poor gloss and contain whitish stripes and flecks.

In addition, extruded parts obtained from the conventional glass fiber-containing polycarbonates contain many pores and are completely opaque.

Furthermore, these low density glass fiber-containing polycarbonates are not resistant to solvents, swelling agents and hydrolytic agents.

Therefore, it is an object of this invention to provide an improved polycarbonate. Another object of this invention is to provide an improved polycarbonate containing glass fibers. Still another object of this invention is to provide a glass fiber-containing polycarbonate having a density above about 98 percent based on the theoretical value. Still another object of this invention is to provide a glass fiber-containing polycarbonate which is resistant to solvents, swelling agents and hydrolytic agents. A further object of this invention is to provide a glass fiber-containing polycarbonate having smooth and glossy surfaces. A still further object of this invention is to provide a glass fiber-containing polycarbonate having improved tensile and impact strength. A still further object of this invention is to provide a method for improving the physical properties of the glass fiber-containing polycarbonate.

The foregoing objects and others will become apparent from the following description and are accomplished in accordance with the invention, generally speaking, by providing glass fiber-containing high molecular weight polycarbonates having a density which lie above about 98 percent of the theoretical value.

In other words, we have found that polycarbonates containing glass fibers which have a density above about 98 percent, and preferably above about 99 percent of the theoretical value exhibit increased tensile strength and increased impact strength when compared with glass fiber-containing polycarbonates prepared in the conventional manner.

In addition, we have found that injection molded parts having a density of at least 98 percent of the theoretical value have smooth and glossy surfaces, while material having a density below 98 percent of the theoretical value exhibit a poor gloss and have rough surfaces with whitish stripes and flecks thereon. Also, extruded parts produced from densified material possess smooth and glossy surfaces which are uniformly translucent, while the non-densified material has rough surfaces containing many pores and are completely opaque. Furthermore, the densified material is more resistant to solvents, swelling agents and hydrolytic agents than the non-densified material.

By densified material we mean to include glass fiber-containing polycarbonate material having a density above about 98 percent of the theoretical value.

Maximum density glass fiber-containing polycarbonates can be achieved by exerting subatmospheric or superatmospheric pressures upon the glass fiber-polycarbonate composition by any conventional technique which will remove the hollow spaces or gases and vapors occluded therein. One means for achieving maximum density consists of exerting superatmospheric pressure upon injection molded or extruded sheets by passing the solid polycarbonate composition through a sheet press or between pressure rollers, preferably at elevated temperatures but below the melting point of the polycarbonate.

In this method, the pressing time, the pressure applied and the temperature of the pressing plates depends on the strength of the parts to be pressed and can readily be determined for any individual case by a preliminary experiment. The pressing itself can also be extended to other than flat injection molded parts, e.g., to hemispherical shells and the like.

If pressing takes place continuously, especially in conjunction with an extrusion, then the necessary pressing time is reduced by the period of time otherwise required for heating the parts to the desired temperature for pressing.

The conditions of the pressing, continuous or discontinuous, can be selected within wide limits, e.g., at a temperature of 190° C. with 7 kp./cm.$^2$ and a pressing time of 15 minutes up to 1000 kp./cm.$^2$ for 10 seconds.

Pressing leads not only to a reduction of the thickness of the sheet but at the same time also to an increase in the density of the material.

The pressing leads to an improvement of the electrical, mechanical and optical properties. For example, parts produced by a continuous or discontinuous pressure treatment possess a very uniform translucence which is of interest for numerous fields of application, e.g., for constructional elements for electrical devices, decorative parts, e.g., furniture fittings, Venetian blinds, etc., parts for lighting technology, such as coverings for light sources and the like.

Parts so produced, for example, sheets can be advantageously stamped, drilled, sawn, printed, lacquered, metallized, etc., and are suitable, for example, for printed circuits, relays parts and the like for which hard papers have previously been used.

Another means for achieving the maximum density of glass fiber-containing polycarbonates, consists of first working the glass fiber material into the polycarbonate melt and then subjecting the mixture before cooling to subatmospheric pressure, for example, of between about 0.01 and about 200 mm. Hg, preferably 0.1 to 40 mm. Hg. This method of operation can be advantageously carried out in mono- or multi-screw extruders. The output as well as the residence time in these extruders depend upon both the speed of rotation and the diameter of the screw. The speed of rotation, the amount of output and the length of the vacuum zone also influence the vacuum to be applied.

A glass fiber-containing melt so treated yields, upon cooling, without any difficulty, i.e., without the use of additional pressure, e.g., when extruding into the free atmosphere, a material of the desired maximum density. This density is retained even where the glass fiber-containing polycarbonate is again melted and remolded. It is thus possible by evacuation of the glass fiber-containing melt and extrusion thereof, to extrude a strand, chop this into a granulate and thus to obtain a semi-finished material such as is commercially available and suitable for further working up according to the injection molding or extrusion process. The melt can also be further worked up directly after evacuation, into sheets, foils, rods, tubes, profiles, and the like. Articles such as Venetian blinds, strips, coated wires or metal bands, flasks and containers can be produced in accordance with the hollow article blow molding process.

Polycarbonates within the meaning of the present invention are the polycondensation products of organic, preferably aromatic, dihydroxy compounds, especially bis - (hydroxyaryl) - alkanes, -cycloalkanes, sulfones, ethers, sulfides, sulfoxides, and the like, with carbonate group-yielding derivatives of carbonic acid, such as phosgene, bis-chloro-carbonic acid esters of aromatic dihydroxy compounds and diesters of carbonic acids to form a resinous material having a molecular weight above about 10,000, especially between about 20,000 and 150,000. Polycarbonates which are branched or can be subsequently cross-linked due to the presence of reactive side chains, can also be used for the invention, as well as mixed polycarbonates from several bis-phenols or mixtures of various polycarbonates.

Any suitable polycarbonate and preferably a polyarylcarbonate and more preferably mixed polyarylcarbonates may be used in accordance with the present invention. Suitable polycarbonates are disclosed in, for example, U.S. Patent 3,028,365; British Patent 808,485; German Patent 1,007,996; U.S. Patent 2,997,459; British Patent 772,627; British Patent 808,486 and British Patent 808,487. As is evident from the patents, polycarbonates and preferably polyarylcarbonates to be employed in accordance with the present invention may be produced from aromatic phenols especially alkylidene bisphenols, alkylidene bishydroxy cycloalkanes, bis(hydroxyphenyl)-ethers, bis(hydroxyphenyl)sulfides, bis(hydroxyphenyl)-sulphones, bis(hydroxyphenyl)sulfoxides and the like. It is also possible to use polycarbonates based on mixtures of the foregoing bisphenols and the like with aromatic, aliphatic or cycloaliphatic dihydroxy compounds.

If the polycarbonate is prepared directly from phosgene and a bisphenol, it is satisfactory to dissolve the bisphenol in aqueous caustic as disclosed in German Patent 959,497 and form a polymer by introduction of phosgene. By combining the aqueous caustic solution with a solvent for the polymer, a growing polymer chain dissolves in the organic phase and the ionic ends continue to grow in the aqueous phase. After removal of the water and solvent a high grade polymer having an intrinsic viscosity of about 0.5 to about 1.5 in dioxan at 30 C. in essentially quantitative yield is obtained. Alternately, the polycarbonate may be produced by the transesterification route wherein a diarylcarbonate is reacted with a dihydroxy aromatic compound under conditions which favor the removal of the phenolic by-products in a well-stirred vacuum kettle. The polycarbonates are well know and the foregoing is set forth to aid in understanding the type of polycarbonates which are most suitable for use in accordance with the present invention.

In the process, any suitable organic dihydroxy compound may be used such as, for example, hydroquinone, resorcinol, pyrocatechol, 4,4' - dihydroxy diphenyl, 1,5-dihydroxy naphthylene, alkylidene bisphenols, di(hydroxyphenyl)ethers, di(hydroxyphenyl)sulfides, di(hydroxyphenyl)sulfoxides, di(hydroxyphenyl)sulfones and the like; ethylene glycol, diethylene glycol, polyethylene glycol 400, thiodiglycol, ethylene dithiodiglycol, propane diol-1,2, propane diol-1,3, butane diol-1,3, butane diol-1,4,2 - methylpropane diol - 1,3, pentane diol - 1,5, hexane diol - 1,6, octane diol - 1,8, 2 - ethyl hexane diol - 1,3, decane diol-1,10, quinitol, cyclohexane diol-1,2, o-, m-, and p-xylene glycol, 2,2-bis(4-hydroxy cyclohexyl)-propane, bis-(4-hydroxy cyclohexyl)-methane, 2,6-dihydroxy decahydronaphthylene. Typical of the beta-alkenyl substituted aromatic dihydroxy compounds are mono- and diallyl and methallyl hydroquinone, 3-mono- and 3,3'-diallyl and methallyl 4,4'-dihydroxy diphenyl, 3-mono- and 3,3'-diallyl and methallyl compounds of bis(4-hydroxy phenyl)-alkanes such as bis(hydroxyphenyl)methane, ethane, propane, butane, cyclohexane and the like as well as the bis(4-hydroxyphenyl)ethers, sulfides, sulfoxides and sulfones.

Suitable glass fiber materials are the products commonly used for the production of glass fiber-containing synthetic resins, preferably those which, instead of the conventional sizes, are provided with a polycarbonate size, as well as the so-called filamented short glass fibers. The glass fiber content of the polycarbonates can vary within wide limits and may lie between about 1 and about 80 percent by weight, preferably between about 1 and about 50 percent by weight, based on the end product.

The introduction and distribution of the glass fiber material may be combined with the production of the thermoplastic resins. Thus, in a continuous or discontinuous process for the production of the thermoplastic resins, the glass fiber material can be added to the solvents, monomers, precondensates and melts.

The process according to the present invention can, for example, be carried out with advantage in an extruder by introducing the glass fiber material into the melt at a point along the screw at which the synthetic resin is not under pressure, through any suitable opening, for example, through one of the usual degassing pipe sockets. The mixing of the glass fiber material with the polycarbonate resin takes place subsequently thereto in the further course of the mixture through the extruder. However, the glass fibers may also be introduced into the melt in other devices which enable a uniform mixing of the glass fiber material with the molten synthetic resin and thereafter extruded as bristle, which are subsequently cut into granulates. The granulates can be worked up according to the usual processes, for example, by molding, injection molding or extruding to form molded articles having a maximum density.

It will be understood that the injection molding composition provided by this invention may be blended with other molding compounds in the conventional manner. The percentage by weight of glass fibers in the composition fed to the injection molding machine may also be varied by blending the glass filled compound with standard molding compositions according to the well understood techniques of the art.

Simultaneously with or separately from the glass fibers, there may also be added to the polycarbonate melt additives such as plasticizers, anti-ageing agents, heat and UV stabilizers, stabilizers against hydrolytic decomposition, anti-statics, lubricants, flowing agents and/or other additive materials, such as glass powder, quartz products, graphite, molybdenum disulphide, powders of high melting synthetic resins, such as polytertafluoroethylene, natural fibers, such as cotton, sisal, asbestos, synthetic fibers, metal powders, metal threads, pigments, dyestuffs and the like. Also some can be embedded between extruded strips, preferably in the form of mats and fabrics, e.g., glass fiber mats or glass fiber fabrics or metal fabrics. Incorporation of the above mentioned materials in granulates by pressing and the like is also possible.

The improved glass fiber-containing polycarbonate material according to the present invention is especially suitable for the extrusion of profiles of all kinds, e.g., laminae, strips, furniture fittings. Venetian blinds and the like, especially where the parts require a high surface gloss, e.g., in domestic appliances and in motor vehicle construction where it is a question of external coverings and great value is placed on high surface gloss. In addition, the glass fiber polycarbonate material is suitable for constructional elements in electrotechnology, e.g., contact plates, parts of relays, printed circuits, constructional elements and the like, as well as casings for measuring instruments, parts of fishing tackle, dental protheses and the like.

The invention is further illustrated but is not intended to be limited by the following examples in which all parts and percentages are by weight unless otherwise specified.

EXAMPLE 1

Sheets produced, by means of injection molding, from glass fiber-containing Bisphenol A polycarbonate (relative viscosity 1.32, measured on a solution of 0.5 part polycarbonate in 100 cc. methylene chloride at 25° C.; glass content 29%) with a thickness of about $1.0 \pm 0.24$ mm. are pressed on a plate press with about 70 kp./cm.$^2$ at a plate temperature of about 180° C. for about 120 seconds, with the insertion of a frame, to a thickness of about 1.0 mm. The injection molded sheets possess, before pressing, a density of about 1.38 g./cm.$^3$ (theoretical 1.412, i.e., 97.7%) and a tensile strength of about 682 kp./cm.$^2$ with 1% elongation. After pressing, the sheets have a density of about 1.410 g./cm.$^3$ (=99.8%) and a tensile strength of 720 kp./cm.$^2$ with 1% elongation. The tensile strength is markedly increased by the pressing technique.

In comparison with the injection molded sheets, the pressed sheets show a thickness tolerance of about $1.0 \pm 0.2$ mm. Also the surface roughness previously present in injected molded sheets has disappeared.

EXAMPLE 2

A lamella produced in known manner by the extrusion process from glass fiber-containing polycarbonate of the same kind as in Example 1, which is opaque and has a rough surface (glass fiber content 31%, width 36 mm., thickness 1.2 mm.) is pressed in a heated press (temperature of the press plates about 180° C.) with a pressure of about 70 kp./cm.$^2$ for about 120 seconds (width thereafter 38 mm., thickness 0.85 mm.). After pressing, the initially rough lamella is smooth, translucent and possesses a greater strength. The density of the non-pressed sheet is 1.08 g./cm.$^3$ (=75.5%), while the density of the after-pressed sheet is 1.43 g./cm.$^3$ (=100%) (theoretical density 1.43).

EXAMPLE 3

A strip of glass fiber-containing polycarbonate corresponding to that of Example 1 (glass fiber content 25%) having a thickness of 1 mm. is continuously pressed to 0.8 mm. thickness by means of small pressure rollers which are heated to about 150° C. by means of circulating oil. The strip is passed through the rollers at a velocity of about 0.5 meter/minute. The density of the strip before rolling is about 1.13 g./cm.$^3$ (theoretical 1.38=81.9%), while the density after rolling is about 1.353 g./cm.$^3$ (=98.0%). The calendered strip is completely smooth and translucent. The tensile strength of the non-pressed strip is about 550 kp./cm.$^2$ with 0.1% elongation, the breaking strength is about 687 kp./cm.$^2$, and the E-modulus is about 58,000 kp./cm.$^2$. After pressing, the tensile strength is about 748 kp./cm.$^2$ with 0.1% elongation, the breaking strength is about 1030 kp./cm.$^2$, and the E-modulus is increased to about 64,000 kp./cm.$^2$.

EXAMPLE 4

Into a commercial single screw extrusion device having the following temperature profile, beginning with the feed hopper: 300, 290, 280° C. is added Bisphenol A polycarbonate granulate ($\eta_{rel.}$ 1.31 measured in 0.5% methylene chloride solution at 25° C.). After passing through the melting zone, the material is mixed with glass fibers and subsequently subjected to a vacuum of about 0.5 mm. Hg in a decompression zone of about 200 mm. The output amounts to about 10 kg./hour. The material so produced possesses a glass content of about 30% and a density of about 1.41 g./cm.$^3$ (theoretical 1.42= 99.2%). This material is suitable for the production of extruded parts and large-surface injection molded parts having high surface gloss.

EXAMPLE 5

In corresponding manner, there is obtained, from a double-screw extruder having a screw diameter of about 83 mm., a decompression zone of about 300 mm. and a pressure of 35 mm. Hg at an output of about 35 kg./hour, a granulate having a density of about 1.40 g./cm.$^3$ (=99.1%, theoretical 1.412) and a glass content of about 29%. In the following table the properties of sheets extruded from this granulate and test bodies cut therefrom are compared with the properties of correspondingly produced granulate and test bodies where the melt has not been subjected to a reduced pressure.

TABLE

| | Test body from Evacuated Material | Test body from Non-Evacuated Material |
|---|---|---|
| Density, percent | 99.4 | 83.2 |
| E-modulus, kp./cm.$^2$ | 58,000 | 51,000 |
| Tensile strength | 725 | 510 |
| Bending strength, kp./cm.$^2$ | 1,210 | 870 |
| Impact strength, cm.-kp./cm.$^2$ | 18.8 | 13.1 |

In addition, the test bodies prepared in accordance with this invention are considerably more translucent, possess a much smoother and glossy surface when compared with those test bodies made in accordance with the conventional techniques.

Although the invention has been described in considerable detail in the foregoing for the purpose of illustration, it is to be understood that such detail is solely for this purpose and that variations can be made therein by those skilled in the art without departing from the spirit and scope of the invention except as set forth in the claims.

What is claimed is:

1. A high molecular weight polycarbonate resin containing glass fibers and having improved properties, said resin being free of hollow spaces and occluded gases to such an extent that the density thereof is at least about 98 percent of theoretical.

2. The composition of claim 1, wherein the glass fiber is present in an amount of from about 1 to about 80 percent by weight.

3. The composition of claim 1, wherein the polycarbonate is a poly(di-monohydroxy arylene alkane carbonate).

4. The polycarbonate of claim 1 which contains from about 1 percent to about 80 percent by weight glass fibers having a density of at least 98 percent of theoretical, a tensile strength of about 720 kp./cm.² or higher, a breaking strength of about 870 kp./cm.² or higher and an E-modulus of about 51,000 or higher.

5. The resin of claim 1 wherein the density is at least about 99 percent of theoretical.

6. A method for making a polycarbonate resin having glass fibers dispersed therein and an improved resistance to solvents and hydrolysis which comprises pressing the said resin at an elevated temperature but below the melting point thereof until occluded gases and voids are removed and the density is at least 98 percent of theoretical.

7. A method for making a polycarbonate resin having glass fibers dispersed therein, a density of at least 98 percent of theoretical and improved resistance to solvents and hydrolysis which comprises dispersing glass fibers in a polycarbonate melt, reducing the pressure thereon to from about 0.1 to about 200 mm. mercury until occluded gases are removed, and cooling the melt until solidified.

References Cited

UNITED STATES PATENTS

| 2,447,415 | 8/1948 | Lyon | 264—102 |
| 2,891,921 | 6/1959 | Kumnick et al. | 260—41 X |
| 2,997,459 | 8/1961 | Schnell et al. | 260—47 X |
| 3,028,365 | 4/1962 | Schnell et al. | 260—47 X |
| 3,235,640 | 2/1966 | Carton et al. | 264—102 |
| 3,267,075 | 8/1966 | Schnell et al. | 264—102 |

FOREIGN PATENTS

| 1,477,938 | 3/1967 | France. |

MORRIS LIEBMAN, Primary Examiner

L. T. JACOBS, Assistant Examiner

U.S. Cl. X.R.

264—102